(12) United States Patent
Zarom

(10) Patent No.: US 8,774,534 B2
(45) Date of Patent: Jul. 8, 2014

(54) SYSTEM AND METHOD FOR IMAGE COMPRESSION

(75) Inventor: Rony Zarom, New York, NY (US)

(73) Assignee: Watchitoo, Inc., New York, NY (US)

( * ) Notice: Subject to any disclaimer, the term of this patent is extended or adjusted under 35 U.S.C. 154(b) by 268 days.

(21) Appl. No.: 13/259,877

(22) PCT Filed: Apr. 8, 2010

(86) PCT No.: PCT/US2010/030425
§ 371 (c)(1),
(2), (4) Date: Sep. 23, 2011

(87) PCT Pub. No.: WO2010/118254
PCT Pub. Date: Oct. 14, 2010

(65) Prior Publication Data
US 2012/0020581 A1     Jan. 26, 2012

(51) Int. Cl.
G06K 9/36     (2006.01)
G06K 9/62     (2006.01)
G06K 9/46     (2006.01)

(52) U.S. Cl.
USPC .......................................... 382/232; 382/209

(58) Field of Classification Search
USPC ......... 382/173, 218–220, 232, 233, 240, 243; 715/242; 716/106, 136
See application file for complete search history.

(56) References Cited

U.S. PATENT DOCUMENTS

| | | | |
|---|---|---|---|
| 5,649,030 A | 7/1997 | Normile | |
| 6,061,473 A | 5/2000 | Chen | |
| 6,912,316 B2 * | 6/2005 | Botchkarev | 382/232 |
| 7,836,396 B2 * | 11/2010 | Becker | 715/242 |
| 7,987,442 B2 * | 7/2011 | Rajski et al. | 716/136 |
| 2002/0061065 A1 | 5/2002 | Moore | |
| 2003/0058943 A1 | 3/2003 | Zakhor | |
| 2006/0115166 A1 | 6/2006 | Sung | |
| 2006/0268164 A1 | 11/2006 | Nakayama | |
| 2008/0159640 A1 | 7/2008 | Liu | |
| 2008/0240226 A1 * | 10/2008 | Okmianski et al. | 375/240 |
| 2012/0020581 A1 * | 1/2012 | Zarom | 382/233 |

FOREIGN PATENT DOCUMENTS

| | | |
|---|---|---|
| EP | 0 831 659 | 3/1998 |
| JP | H06-21828 | 1/1994 |
| JP | H07-288474 | 10/1995 |
| WO | WO 2005/015501 | 2/2005 |
| WO | WO 2009/014156 | 1/2009 |

OTHER PUBLICATIONS

International Search Report for Internation Application No. PCT/US10/130425 mailed Jun. 2, 2010.

(Continued)

*Primary Examiner* — Amir Alavi
(74) *Attorney, Agent, or Firm* — Pearl Cohen Zedek Latzer Baratz LLP (57) ABSTRACT

A system and method for compressing a digital image may store a dictionary having a plurality of predetermined template patterns each identified by a code. The image may be divided into a plurality of sub-regions, and a template pattern may be selected from the dictionary that most closely matches an image features for each sub-region. A compressed data set may be generated for the image in which each sub-region is represented by a code identifying the associated template pattern. Once the data is compressed, the image may be reconstructed using the code from the compressed data set to retrieve the template pattern from the dictionary for each sub-region and may reconstruct a full image by combining the template patterns for all of the sub-regions.

22 Claims, 4 Drawing Sheets

(56) References Cited

OTHER PUBLICATIONS

Alameideen. et al. "Frequent Pattern Compression: A Significance-Based Compression Scheme for I2 Caches." Technical Report 1500 [onlineJ, Apr. 2004 [retrieved on May 19, 2010J. Computer Sciences Dept.. U. of Wisconsin-Madison. pp. 1-13. Retrieved from the Internet: <URl: http://pages.cs.wisc.edu/alaaipapersltr1500_frequenCpattem_compression. pdf>.

Alzina. et at "2D-Pattem matching Image and Video Compression." Data Compression Conference [onlineJ. Mar. 1999 [retrieved on May 19, 2010). pp. 424 453. Retrieved from the Internet: <URl: http://citeseerx.ist.psu.edu/viewdocldownload?dol=10.1.1.52.6598&rep=rep1&type=pdf>.

Howard "Text Image Compression Using Soft Pattern Matching." The Computer Journal [online]. 1997 [retrieved on May 19, 2010]. vol. 40 .• No. 213. pp. 146-156. Retrieved from the Internet: <URl: http://comjnl.oxfordjournals.orglcgilcontenVabstracV40/2_and_3/146>.

European Search Report for European Application No. 10 762 454 dated May 2, 2013.

Paul G Howard et al: "The Emerging JBIG2 Standard", IEEE Transactions on Circuits and Systems for Video Technology, IEEE Service Center, Piscataway, NJ, US, vol. 8, No. 7,Nov. 1, 1998, XP011014519, ISSN: 1051-8215.

Osama K Al-Shaykh et al: "Video Compression Using Matching Pursuits", IEEE Transactions on Circuits and Systems for Video Technology, IEEE Service Center, Piscataway, NJ, US, vol. 9, No. 1, Feb. 1, 1999, XP011 014533, ISSN: 1051-8215.

Gersho A et al: "Image Coding Using Vector Quantization", International Conference on Acoustics, Speech & Signal Processing. ICASSP. Paris, May 3-5, 1982; [International Conference on Acoustics, Speech & Signal Processing. ICASSP], New York, IEEE, US, vol. 1, May 3, 1982, pp. 428-431, XP001 031 071.

Office Action for Japanese Patent Application No. 2012-504873, dated Mar. 11, 2014.

Office Action for Australian Patent Application No. 2010234364, dated Feb. 27, 2014.

Office Action for Singapore for Singapore Patent Application No. 201107354-1, dated Feb. 4, 2014.

Office Action for Russian Application No. 2011140866, mailed Apr. 15, 2014.

\* cited by examiner

SYSTEM AND METHOD FOR IMAGE COMPRESSION

This application is a 371 of PCT/US10/30425 filed on Apr. 8, 2010, which claims benefit of 61/167,536, filed on Apr. 8, 2009.

FIELD OF THE INVENTION

The present invention relates to systems and methods for image compression, and in particular for reducing the amount of data used to represent images.

BACKGROUND OF THE INVENTION

Digital imaging may create digital images, typically from a physical object. A digital image may be created directly from a physical scene by a camera or similar devices. Alternatively, a digital image may be obtained from another image in an analog medium, such as photographs, photographic film or printed paper, and may be converted to a digital medium by a scanner or similar device. Many technical images, such as those acquired with topographic equipment, such as computed tomography (CT) scans, side-looking radar or radio telescopes, are obtained by complex processing of non-image data. Finally, a digital image may also be computed from a geometric model or mathematical formula.

A digital image may include pixels. A pixel may be the smallest piece of information in an image. Pixels are normally arranged in a regular two dimensional grid, and are often represented using dots, squares, or rectangles. Each pixel may have a value that represents a property of a sample of an original image. Increasing the density of pixels or samples typically provides a higher resolution or more accurate representation of the original image. The intensity of each pixel may be variable. In color systems, each pixel may have three or four color components such as red, green, and blue, or cyan, magenta, yellow, and black.

Image resolution may measure the quality of an image. Image resolution may be defined by the pixel dimensions in a digital image. An image that is an integer, N, pixels high by an integer, M, pixels wide may have any resolution less than or equal to N×M pixels (spanning N lines of picture height or N TV lines). Another popular convention defines resolution as the total number of pixels in the image, typically given as a number of megapixels, which may be calculated by multiplying pixel columns by pixel rows (N×M) and dividing by one million. Other conventions define resolution by pixels per length unit or pixels per area unit, such as pixels per inch or per square inch. These calculated pixel resolutions are generally inexact (the true resolutions may be smaller than the calculated resolutions) and may serve as approximations or upper bounds of the true image resolution. Generally, the higher the resolution is, the more details are presented in the picture.

Pixels may be stored in a computer memory as a raster image or raster map, or bitmap: a two-dimensional array of small integer values. These values are often transmitted or stored in a compressed form. Each pixel of a raster image is typically associated with a specific "position" in a two-dimensional (2D) image region and values of one or more image features at that position. Digital images may be classified according to the number and nature of those pixel samples.

Image compression may reduce redundancy of the image data in order to decrease the amount of image information to be stored or transmitted. Image compression may be "lossy" (when the decompressed data is different from the original due to loss of data) or "lossless" (when the decompressed data exactly matches the original data). Lossy data may be used when the lost data is sufficiently small or when the benefit of data reduction outweighs the damages due to data loss. Lossless data compression allows the exact original data to be reconstructed from the compressed data. Lossless compression may be used when it is important for the original and the decompressed data to be identical, or when the importance of exact duplication or an allowable deviation therefrom is unknown. Typical data types compressed by lossless data compression are executable programs and source code. Some image file formats, like Portable Network Graphics (PNG) or Graphics Interchange Format (GIF), typically use only lossless compression, while others like Tagged Image File Format (TIFF) and Multiple-image Network Graphics (MNG) may use either lossless or lossy compression.

Compression mechanisms may require different amounts of processing power to encode and decode. The quality of a compression method is often measured by a peak signal-to-noise ratio. The peak signal-to-noise ratio may measure the amount of error or noise introduced through a lossy compression of the image. However, the subjective judgment of the viewer is also regarded as an important, perhaps the most important, measure of compression accuracy.

SUMMARY OF THE INVENTION

There is an unmet need for, and it would be highly useful to have, a system and method for image compression that is more true to the nature of the image content itself yet also provides extensive compression of the image data.

Embodiments of the invention may overcome deficiencies of the background art by dividing an image into a plurality of sub-regions and representing each image sub-region by one or more similar template pattern(s) from among a dictionary or database of pre-existing image template pattern(s).

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings. Specific embodiments of the present invention will be described with reference to the following drawings, wherein:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

The present invention is of a system and a method for reducing the size of images through compression.

Embodiments of the invention may divide an image into a plurality of sub-regions and represent each image sub-region by one or more similar template pattern(s) retrieved from a dictionary or database of pre-existing image template pattern (s). For example, if a portion of an image contains primarily green hues, such as that of a forest scene containing grass and trees, a green template may be used to represent the image portion. Optionally, an entire image may be tagged with an overall (e.g., average) template pattern, while the individual pixels of the image are represented by data relative to that template pattern (or optionally a plurality of template patterns). In such embodiments, instead of representing each pixel as an absolute measure (e.g., red, blue, or green), each pixel value may measure a property (e.g., a level of "redness," "blue-ness," and/or "green-ness") relative to the (e.g., red, blue, and/or green) template pattern(s). Since the template pattern(s) approximate the original image, many pixels may exactly match the template pattern so that no image data may be used to represent those pixels. Accordingly to such embodiments, a smaller amount of data may be used to represent an image in comparison to the original image data and, as such, may be more efficient to transmit and store.

Such embodiments may be equally applied to a full image or a portion of the image, where a plurality of groups of pixels are described by a constant or governing function attribute, such as for example a template pattern with color. An image may be divided into sub-regions in a number of ways. For example, an image matrix may be linearly divided to represent a smaller group of pixels within the image, for example, where each 3 by 3 sub-matrix of the image may represent a sub-region. Known algorithms for image division, for example, but not limited to "k-means" or other algorithms for selecting areas or sub-regions of pixels may optionally be utilized to identify sub-regions within the image.

The image may be divided into a plurality of sub-regions, each sub-region forming a sub-matrix of the image matrix and hence representing a sub-region of pixels. For example, each sub-matrix may represent a square, rectangle or other polygon, of a plurality of pixels. As a non-limiting example, each square may optionally include values for a 10×10 pixel sub-region.

Once the image has been divided into a plurality of sub-regions, the color or other image features may be examined for that sub-region. The image feature examined may be the most dominant feature in the sub-region. For example, if the image feature is related to a pattern with a particular color, then the most dominant color in that sub-region may be examined. The dominant color (or other image feature) may then be compared to a plurality of such colors (or other image features) stored in a dictionary or image feature database. A processing unit may automatically determine which of the dictionary colors (or other image features) most closely matches the colors (or features) for each sub-region. Alternatively, a plurality of colors may be examined for each sub-region, in which case the above process may be performed with regard to the plurality of colors and their relative location (s).

Next, a template pattern with an image feature representation that most closely matches the representation for each sub-region may be selected from the dictionary. All of the pixels in that sub-region may then be replaced by the corresponding pixel values of that template pattern. The template pattern may be represented by a dictionary number (e.g., a code, address or other reference marker uniquely identifying a template pattern or function in the dictionary). In some embodiments, only a single dictionary number may be sent, stored, or otherwise used, to represent or encode the plurality of pixels in each sub-region, thereby resulting in significant decrease in the amount of data required to represent the pixels in each image sub-region.

Any shape or number of pixels may optionally be used for each sub-region; however, the smaller the size of each sub-region, the greater the number of sub-regions used per image. Such an increase in the total number of sub-regions and a decrease in the size of each sub-region may increase the pixel resolution and provide a greater fidelity to the original image, but may also increase the amount of data required to represent the original image. A parameter defining the size, shape, and/or density of the image sub-regions may be adjusted by the user or, alternatively, may be automatically adjusted or set by a computer processor (for example, to maintain a predetermined maximum permitted data for representing an image and/or a predetermined minimum fidelity or accuracy allowable to represent the original image).

According to some embodiments of the present invention, each template pattern may include values for a plurality of image features, properties, or variables. The image features or variables may include, but are not limited to, color, color gradient, gradient direction, or reference pixel.

In some embodiments, compressed data representing pixels may simply be a reference to one or more similar template pattern(s) or value functions from the dictionary. The compressed data may be "lossy" when the template pattern(s) do not match the original images exactly. In another embodiment, in order to generate a "lossless" compression, an additional difference (or "error") value may be assigned to each pixel defining the difference between the template pattern(s) and the original image. The original image may thereby be exactly reconstructed (decoded) by using the template pattern (s) and then adding the error values for each pixel.

The reverse action, to decode compressed data in which the image is reconstructed from the template pattern, may be executed by a processor or decoder. The decoder may retrieve the template pattern or closest function attribute representation of the image from the dictionary or database (e.g., identified by the dictionary code). The decoder may use the template(s) (and optionally error data) to reconstruct the original image. When lossy compression is used, any difference between the template pattern and the original image is data lost by the compression. When a lossless compression is used, the difference or error values may be recorded for each pixel and sent to the decoder, for example, together with or separately from the template data, to recreate the original image, with no loss of data regarding the difference between the template pattern and the original image.

With lossy compression, the closer the template pattern and original image match, the less data is lost. When lossless compression is used, the closer the template pattern and original image match, the less error data is stored and transmitted with the compressed image data (a perfect match yields no error data). Accordingly, to improve the accuracy of lossy compression or to reduce the amount of error data used in lossless compression, the dictionary may be adjusted during the compression process to better fit the original images. In one embodiment, a plurality of modified dictionaries may be provided with additional or modified template pattern(s). For example, for image transmission, the dictionary or just the modified portions thereof may be sent periodically, at least more than once, as the image is compressed and sent.

For example, assume an initial image is represented by a matrix that is 9 pixels by 9 pixels, giving an overall 81 pixel image. This image may be divided, for example, into a group of nine 3×3 pixel sub-regions or sub-matrices. Each sub-region may be evaluated for a relevant pattern including one or more of the above image features or variables. The closest template pattern may be selected from a dictionary by comparison to a plurality of such template patterns. Alternatively, if no pattern in the dictionary shows a significant benefit over the others, a default template pattern may be used, for example, one having the least amount of data, such as a monochromatic template with an average color value. In another embodiment, if a sufficiently close template pattern is not present in the dictionary, then a new template pattern may be added to the dictionary. The new template pattern may replace a previously existing pattern in the dictionary or may be added as an additional pattern. For replacing a previously existing pattern, the previously existing pattern that is to be replaced may be selected according to one or more criteria, which may include at least not being previously used (or being used most infrequently) to represent an image sub-region. Additionally or alternatively, the pattern to be replaced may be the pattern that is closest to the new pattern or the pattern that is most different from other pre-existing patterns in the dictionary, for example, to provide a wider range of template options.

In some embodiments, a processor may automatically determine which of the template patterns in the dictionary is "closest" to an original image or image sub-region. The "closeness" of template patterns to an original image or image sub-region may be determined according to any type of pattern or image comparison function known in the art. In some embodiments, greater emphasis may be placed upon closeness of some features (e.g., the color of individual pixels) than other features (e.g., an overall color and/or intensity gradient, or vice versa). For example, the processor may rank or score each template using a weighted comparison function, where the comparison of different features may be given different weights or priorities.

Once the representative template pattern(s) have been selected to represent each image sub-region, the sub-region may be represented by the number, code or address in the dictionary corresponding to those template(s). Optionally, the compressed data may include the size or dimensions of the image sub-region; however, if an image is divided into equal sized sub-regions, then this size descriptor need not be included or may only be included once with the data, or each time the size of the sub-regions changes. In addition, the compressed data may include the relative location of each sub-region within the original image; however, if the image sub-regions are compressed according to a predetermined or expected order, then the location of each specific sub-region need not be included.

If the compressed data defines a plurality of features of an image, each feature may be represented as a coordinate in a vector. The vector may include not only a color number but other information as well, such as for example, a starting color, color gradient, direction of color gradient and pixel reference mark. Therefore, an initial image of 81 pixels divided into nine 3×3 pixel sub-regions, may be defined by 9 "pixel vectors," each vector defining image values for the plurality of chosen features for each sub-region. Consolidating the different feature values into vectors may reduce the overall storage size of the data and computation burden on the processing units, for example, reducing the number of variables processed by about 45% from 81 (9 by 9) to 36 (9 by 4). The data size may be further reduced when successive images are processed, for example, over a short period of time. Each successive image may be a function of the original base vector variables; therefore, over time, since each image reduces the number of variables processed by about 45%, this reduction may be multiplied for each image that is processed. To further reduce the image data size, each image sub-region may be represented by a simple binary pattern of only two colors (e.g., instead of three or four colors).

According to some embodiments of the invention, rather than determining the above set of one or more variables for each sub-region separately, the process may also provide a plurality of patterns and then selects a pattern which is suitable for each sub-region or group of sub-regions. The patterns provided in a dictionary, may be predetermined or fixed and/or generated or at least adjusted during image compression.

The number of template patterns available for compressing an image may be proportional to, on the order of, or relatively high compared to, the number of individual pixels, the number of rows of pixels, or any dimensions of pixels, in the image. In one example, the number of template patterns may be approximately equal to the square root of the number of pixels in a sub-region (for example, for a sub-region of 256×256 pixels, there may be 256 available patterns). Other or different numbers of patterns may be provided. Although increasing the number of patterns typically increases the size of the dictionary, increasing the number of patterns may also increase the accuracy of the images compressed using the patterns.

Each pattern may include image information, such as gradients of color and/or other image features, reference pixel, gradient direction and so forth. A pattern may be selected for each sub-region from the dictionary of patterns. A reference color may also be selected for each sub-region, which may, for example, be the average color of the pixels in the sub-region. The patterns may be constructed prior to processing or compressing images for providing a pre-defined dictionary, which may for example be at least partially determined heuristically. If a pattern sufficiently similar to the image data for a sub-region is not found in the dictionary, a standard "down-sampling" technique may be applied to reduce the size of the sub-region data. In another embodiment, when no sufficiently similar pattern is found, the data for the sub-region may remain uncompressed.

Alternatively or additionally, a new pattern may be generated to sufficiently match the image sub-region and may be added to the dictionary of patterns. For example, the new pattern may be an exact copy of the sub-region or modified therefrom. A processing unit may establish a threshold to determine which patterns are "sufficiently similar," for example, according to a comparison of parameters for the patterns. The higher the threshold for similarity, the more accurate the image compression may be. In some embodiments, a viewer may define or refine the image compression accuracy standard by comparing reconstructed images from compressions with different similarity thresholds with an original image and selecting, for example, by visual inspection, which of the reconstructed images, and therefore, which similarity thresholds, are acceptable.

A local processing unit may subdivide and compress images as described herein and may then transmit and/or store the compressed image data. The local processing unit may then reconstruct the images to obtain the complete images for display.

Figure 1:
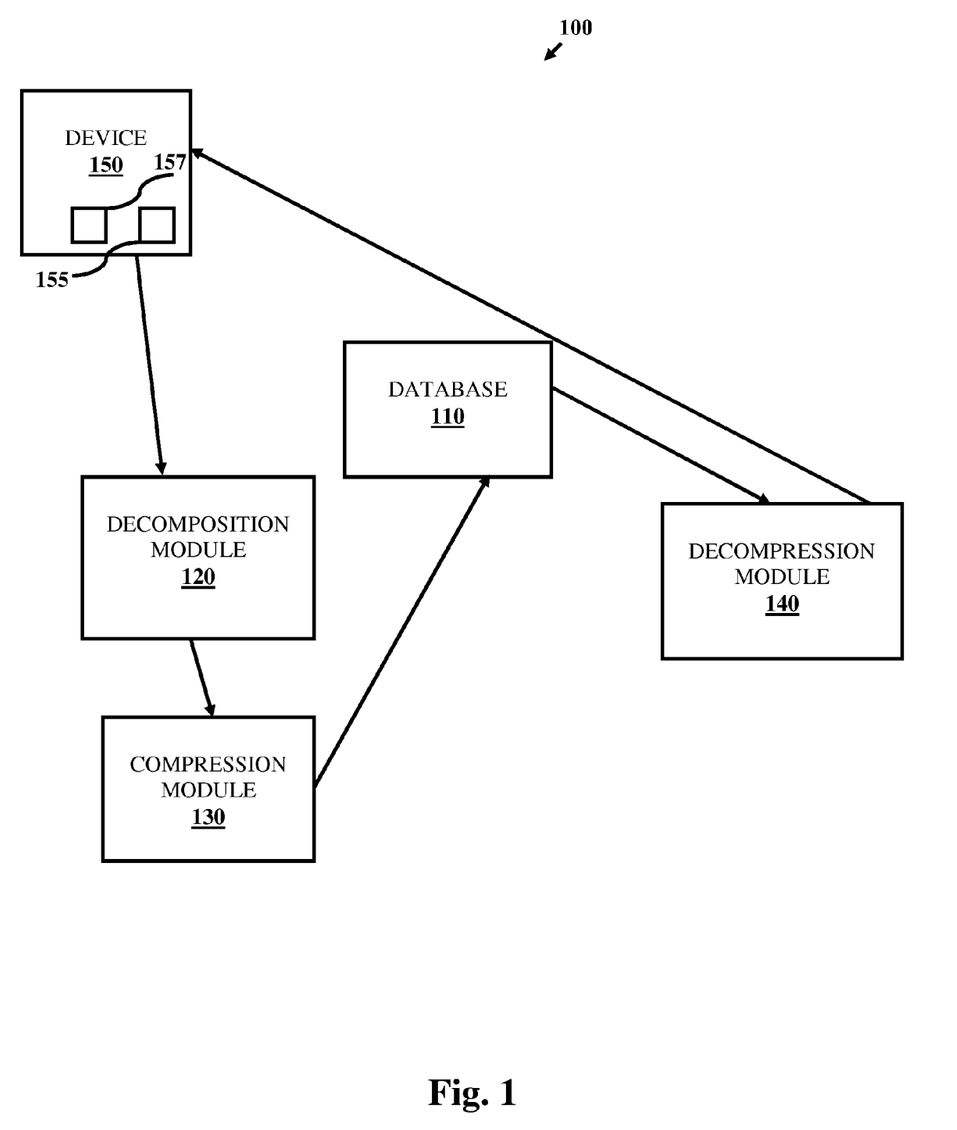
FIG. 1 is a schematic illustration of a system for compressing images, according to an embodiment of the present invention.

Reference is made to FIG. 1, which schematically illustrates a system 100 for compressing images, according to an embodiment of the present invention.

System 100 may include one more devices 150 from which images may be retrieved and/or sent, a database 110 for storing a dictionary of template patterns and/or compressed images, a sub-region decomposition module 120 for decomposing each image into a plurality of sub-regions, a compression module 130 for compressing the data of each sub-region, and a decompression module 140 for reconstructing the image from the compressed sub-region data.

Device 150 may be a computer device, a server, a video or image capture or playback device, cellular device, or any other digital device such as a cellular telephone, personal digital assistant (PDA), video game console, etc. Device 150 may include any device capable of executing a series of instructions to record, save, store, process, edit, display, project, receive, transfer, or otherwise use or manipulate video or image data. Device 150 may include an output device 155 (for example, a monitor, projector, screen, printer, or display) for displaying video or image data on a user interface. Device 150 may include a processor 157. Processor 157 may include a central processing unit (CPU), a digital signal processor (DSP), a microprocessor, a controller, a chip, a microchip, a field-programmable gate array (FPGA), an application-specific integrated circuit (ASIC) or any other integrated circuit (IC), or any other suitable multi-purpose or specific processor or controller.

It may be appreciated that each of database 110, decomposition module 120, compression module 130, and/or decompression module 140 may be integral to device 150 (for example, part of the same stand-alone computer) or separate from device 150 (connected via a wired or wireless network).

Sub-region decomposition module 120 may divide an image into a plurality of sub-regions, where each sub-region may be defined by one or more governing features, such as, color and optionally one or more relevant variable values, for the sub-region. Sub-region decomposition module 120 may divide an image in a number of ways. For example, an image matrix representing the image pixel values may be linearly divided into smaller groups of pixels within the image, for example, into a plurality of sub-matrices, each of which represents an image sub-region. Known mechanisms for image division may be used, for example, but not limited to, "k-means" or other methods for clustering pixels, to identify sub-regions within the image.

Once the image sub-regions are defined, compression module 130 may select a representative pattern for each sub-region, for example, from a dictionary of template patterns stored in database 110. Compression module 130 may then compress the sub-regions. Each template pattern may include image information, such as, color gradient, reference pixel, gradient direction and so forth. A reference color may be selected for each sub-region, which may be, for example, the average, median or mode, color of the pixels in the sub-region.

The compressed image data may be saved in database 110. When device 150 requests a reconstructed image, decompression module 140 may retrieve the compressed image data from database 110 and may decompress the data to exactly or approximately replicate the original image.

Sub-region decomposition module 120 may divide images, compression module 130 may compress images, and decompression module 140 may reconstruct images using a local processing unit, for example, processor 157. The local processing unit may then transmit the reconstructed image to an output controller to be displayed on output device 155.

Figure 2:
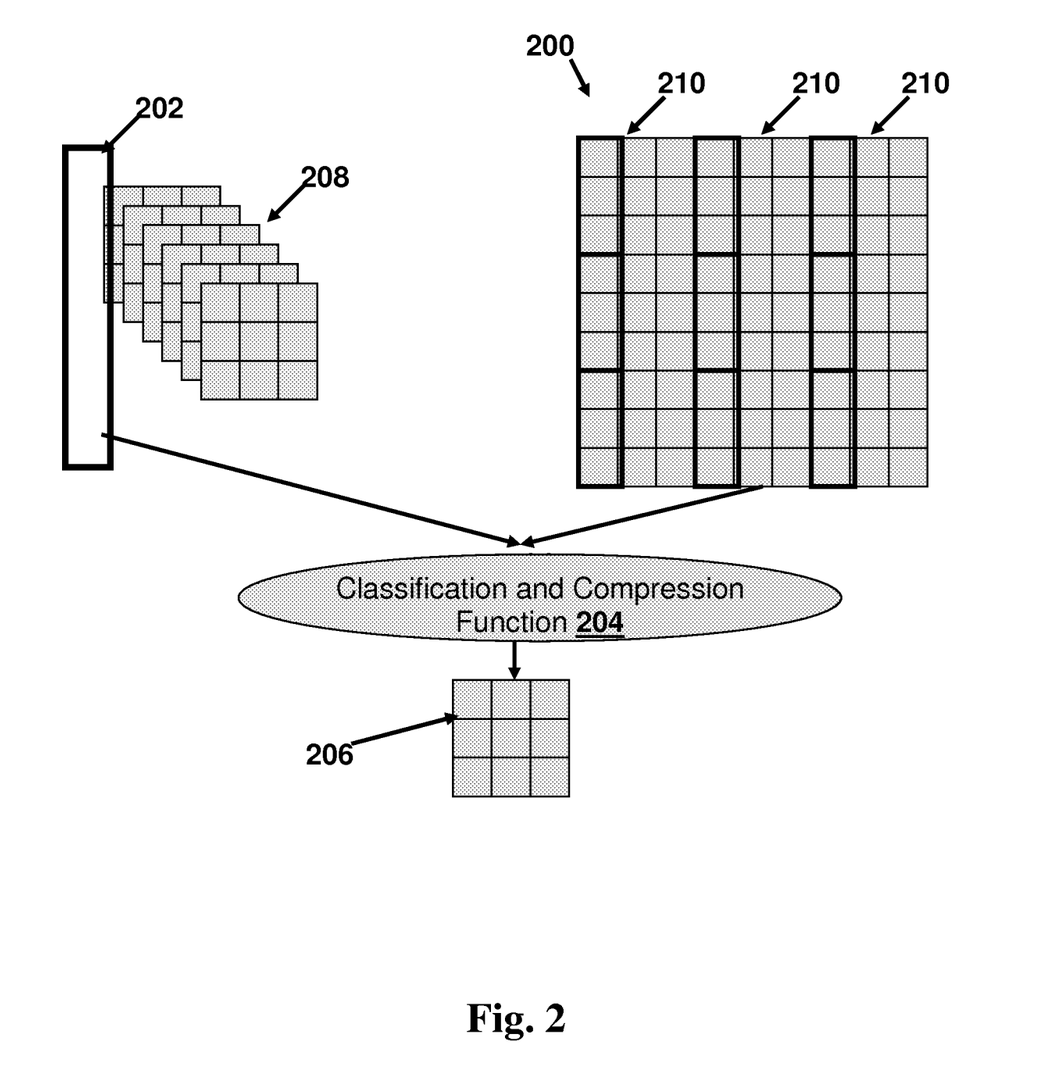
FIG. 2 is a schematic illustration of data structures for compressing images, according to an embodiment of the present invention.

Reference is made to FIG. 2, which schematically illustrates data structures for compressing images, according to an embodiment of the present invention. The data structures may include a sub-region dictionary 202 with a plurality of template patterns 208 for representing a plurality of sub-regions 210 in an original image 200. Template patterns 208 may be pre-determined and generated, for example, heuristically, prior to image compression. Alternatively and/or additionally template patterns 208 may be generated dynamically, for example, in real time for each image or a plurality of images using a current image and/or one or more preceding images. A compression module (e.g., compression module 130 of FIG. 1) may use a classification and compression function 204 to select a template pattern 208 from dictionary 202 to compress each sub-region of original image 200. The compression module may use classification and compression function 204 to select one or more template pattern(s) 208 from dictionary 202, which most closely match the image features, including color or other representative function attributes, of one or more of a plurality of sub-regions 210 of original image 200. The compression module may represent each sub-region 210 by the selected template pattern(s) 208 to generate a compressed image 206. Compressed image 206 may represent each pixel (or a plurality of pixels) in a sub-region 210 of original image 200 by a pointer to a pattern in dictionary 202 and/or a color description, such as a color value or code.

A computer or server (e.g., device 150 of FIG. 1) may generate template patterns 208 in dictionary 202 that provide a range and detail of template options, defined, for example, according to any of a plurality of parameters, including, but not limited to, a predetermined or selected amount of desired compression accuracy, a maximum data size for each compressed image 206, sub-region, pixel square, rectangle or other pixel groupings, and/or any other criteria. In some embodiments, the computer may generate the template patterns 208 in dictionary 202 in a dynamic manner, for example, using image patterns from the actual images being compressed. For a video stream or sequence of similar images, the template patterns 208 in dictionary 202 may be adjusted to compress a current original image 200 according to the image features of previous image frames in the stream. The computer may generate the template patterns 208 in dictionary 202 according to both dynamic (e.g., adapted during processing) and heuristic (e.g., predetermined) characteristics.

When dictionary 202 is modified, the entire dictionary 202 or just the modified portions thereof may be periodically or iteratively transmitted to the compression module, for example, from a database (e.g., database 110 of FIG. 1) where dictionary 202 is stored or directly from the computer generating the changes. When the modified portions of dictionary 202 are periodically transmitted, the entire dictionary 202 may only be transmitted once, for example, for each compression module, project, session, or set of images, thereby reducing the amount of data to be transmitted.

Overall, the quality of the image compression process (e.g., the extent to which the compression is lossy) may be defined by dictionary 202, from which the compression information is retrieved. For example, if the compression module finds a template pattern 208 in dictionary 202 that exactly matches the particular function attribute for each sub-region 210, then the compression may be lossless, while if no exact match is found, then the compression may be lossy. The extent to which the compression is lossy (e.g., the amount of data lost or the error in the image compression) may depend upon how closely the template patterns 208 match the original image sub-regions 210, and hence on the detail and number of template patterns 208 available in dictionary 202. While the extent to which the compression is lossy or lossless is not directly related to the size of dictionary 202, as the number or detail of template patterns 208 in dictionary 202 increases, the size of dictionary 202 increases, and the more likely that exact or closer matches may be found.

Figure 3:
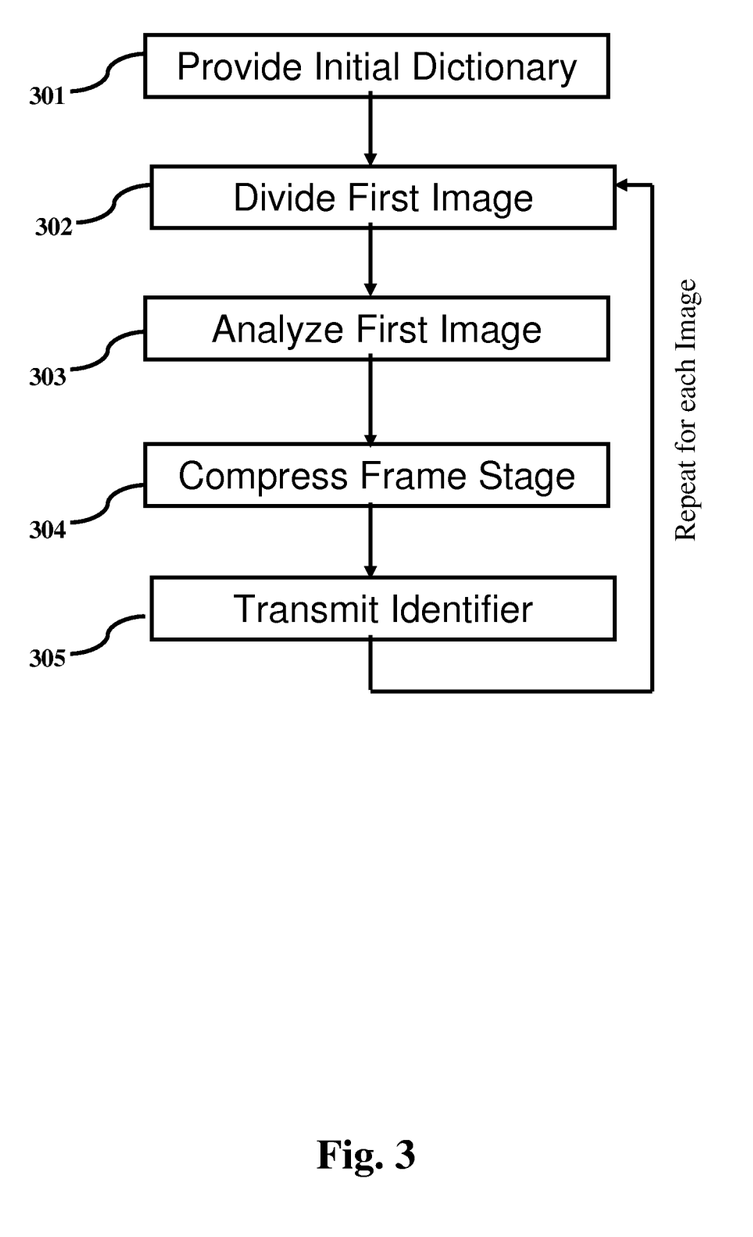
FIG. 3 is a flowchart of a method for compressing image data for one or more image frames, according to an embodiment of the present invention.

Reference is made to FIG. 3, which is a flowchart of a method for compressing image data for one or more image frames, according to an embodiment of the invention.

In operation 301, a database (e.g., database 110 of FIG. 1) may provide a compression module (e.g., compression module 130 of FIG. 1) with an initial dictionary having a plurality of template patterns. The initial dictionary may be received, for example, even before a first image or image sub-region is analyzed. A computer or server (e.g., device 150 of FIG. 1) may generate the template patterns, for example, according to one or more heuristic rules and/or predetermined characteristics.

In operation 302, a decomposition module (e.g., decomposition module 120 of FIG. 1) may receive a first image and may divide the image into a plurality of sub-regions. The sub-regions may be determined geometrically (e.g., the first image is subdivided to generate a predefined number of sub-regions having predetermined dimensions) or based on image content (e.g., the first image is divided along boundaries identified by significant changes in image features such as color).

In operation 303, the compression module may receive a first image and may analyze the image features of the entire image together or of each sub-region separately. The compression module may use a classification and compression function (e.g., classification and compression function 204 of FIG. 2) to determine and/or select a template pattern from the initial dictionary with the most similar image features. If the most similar template pattern is available and/or sufficiently close to the first image or sub-region, then the template pattern may be selected to compress the image or sub-region. Otherwise, the computer or server may generate a new template pattern that sufficiently matches the image or sub-region. The new template pattern may be added to the initial dictionary as an additional image or may replace one or more templates within the initial dictionary to generate a second dictionary.

In operation 304, once a template pattern is selected, the compression module may compress the first image using the template pattern, for example, by representing the image or each sub-region by an identifier to the selected template pattern in the dictionary. In order to generate an exact duplicate of the original image or image sub-region (i.e., "lossless" compression), the difference or "error" value defining the difference between the template pattern(s) and the pixels of the original image or image sub-region, may be transmitted along with the identifier to the selected template pattern. This difference or "error" value may take many possible forms, including, for example, a two-dimensional matrix, wherein the value of each element represents the difference between the values of the corresponding pixels in the original image or sub-region and the selected template pattern as represented in a two-dimensional pixel array. In this case, the sum of the two-dimensional difference matrix and the two-dimensional template pixel array may be a two-dimensional matrix that represents a pixel array of the original image or original image sub-region.

In operation 305, the compression module may transmit the identifier for the selected template pattern in the dictionary, as well as the difference or "error" values, if applicable, to a decompression module (e.g., decompression module 140 of FIG. 1) for decompressing the first image frame, as described in greater detail below in reference to FIG. 4.

Operations 302-305 may be repeated for each additional image frame. Furthermore, if the dictionary is updated with a new template pattern, the new template pattern and/or entire updated dictionary may be transmitted at the end of the aforementioned process, after all images or their sub-regions have been matched to template patterns, or alternatively, more than once during the process, for example, for accommodating one or more updates to the dictionary that may occur during the process. In some embodiments, if an entire image is analyzed as a whole, a process may skip operation 302.

Figure 4:
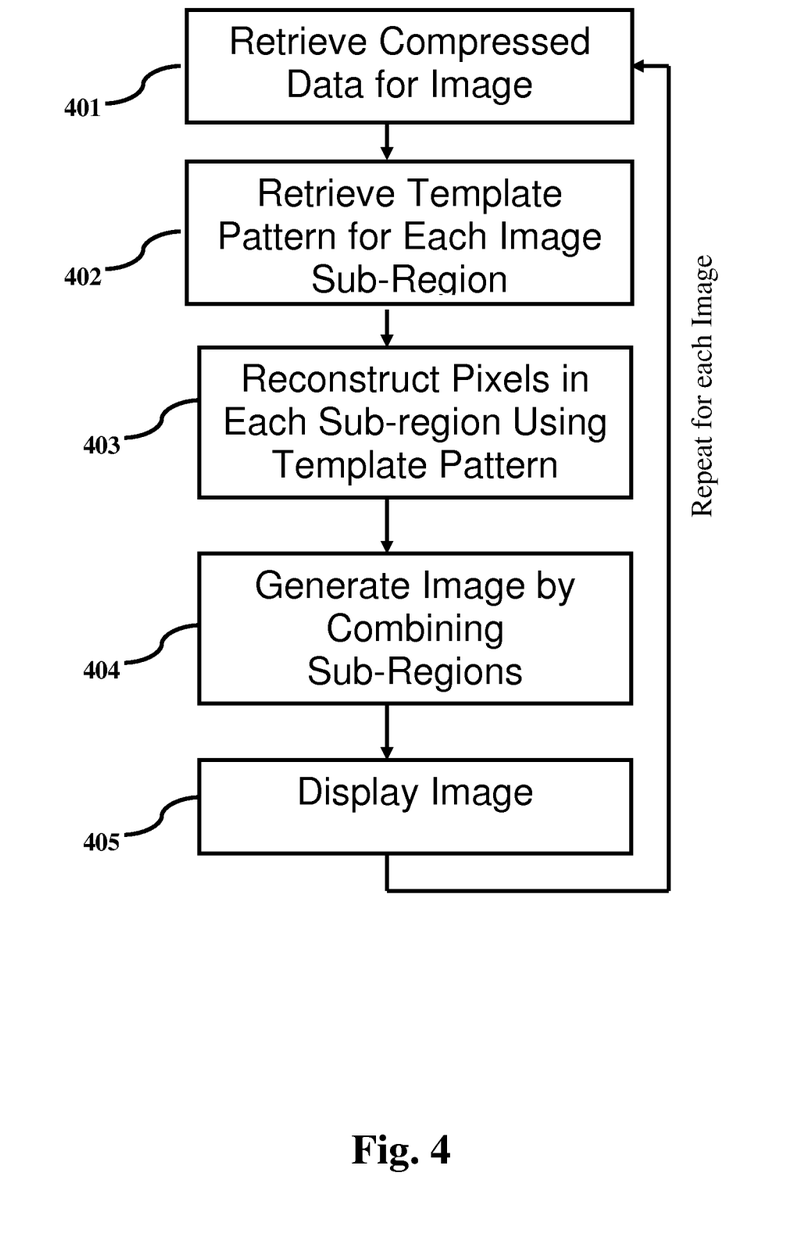
FIG. 4 is a flowchart of a method for decompressing image data to restore one or more original image frames, according to an embodiment of the present invention.

Reference is made to FIG. 4, which is a flowchart of a method for decompressing image data to restore one or more original image frames, according to an embodiment of the invention. The method may decompress data, which was compressed, for example, according to embodiments described in reference to FIG. 3.

In operation 401, a decompression module (e.g., decompression module 140 of FIG. 1) may retrieve compressed data for an image frame. The image may have been divided into a plurality of sub-regions (e.g., as described in operation 302 in reference to FIG. 3). The decompression module may execute operations 402 and 403 for each sub-region of the image frame, as follows:

In operation 402, the decompression module may retrieve a template pattern identifier, as well as the difference or "error" values, if applicable, for the current sub-region from the compressed data. The template pattern identifier may include an address, pointer, or code, to a dictionary or database location storing a unique template pattern.

In operation 403, the decompression module may use the identifier to access the dictionary and retrieve the template pattern pixel values for each pixel (or group of pixels) in the current sub-region. The decompression module may use the template pattern pixel values to reconstruct the sub-region according to those values.

In order to generate an exact duplicate of the original image sub-region (i.e., "lossless" compression), the decompression module may also use the difference or "error" values defining the differences between the template pattern(s) and the pixels of the original image or image sub-region, as discussed above.

In operation 404, the decompression module may combine all the decompressed sub-regions, in sequence, to generate an approximation (using just the template patterns) or exact replica (using both the template patterns as well as the difference values) of the original image. The decompression module may transmit the generated image to a computer or server (e.g., device 150 of FIG. 1).

In operation 405, an output device (e.g., output device 155 of FIG. 1) of the computer or server may display the generated image.

If there are multiple images, such as multiple frames in a video stream, operations 403-405 may be repeated for each image. The operations 403-405 may be run in sequence or in parallel for the multiple image frames.

Embodiments of the invention may include an article such as a computer or processor readable medium, or a computer or processor storage medium, such as for example a memory, a disk drive, or a Universal Serial Bus (USB) flash memory, for storing instructions which when executed by a processor or controller (for example, processor 157 of FIG. 1), carry out methods disclosed herein.

While the invention has been described with respect to a limited number of embodiments, it will be appreciated that many variations, modifications and other applications of the invention may be made.

The invention claimed is:

1. A method for compressing a digital image in a computing device, the method comprising:
dividing an image into a plurality of image sub-regions;
selecting from a dictionary including a plurality of predetermined template patterns, wherein each template pattern comprises a plurality of image features, properties or variables such as color, color gradient, gradient direction or reference pixel, and wherein each said template pattern is identified by a code, a template pattern for each sub-region that most closely matches one or more image features of that sub-region; and
generating a compressed data set for the image, in which each sub-region is represented by a code identifying the template pattern selected therefor.

2. The method of claim 1, wherein the dictionary is determined before a first sub-region is analyzed.

3. The method of claim 1, wherein the dictionary is adjusted as one or more sub-regions are analyzed.

4. The method of claim 1, wherein, if none of the plurality of template patterns in the dictionary sufficiently matches the image sub-region, a new template pattern is generated and added to the dictionary for compressing the image sub-region.

5. The method of claim 1, wherein the image is divided geometrically to generate a pre-determined number of sub-regions having pre-determined dimensions.

6. The method of claim 1, wherein the image is divided based on image content.

7. The method of claim 6, wherein the boundaries between sub-regions coincide with image content boundaries having significant changes in image features.

8. The method of claim 1, comprising selecting a plurality of template patterns for each sub-region, wherein each pattern is selected for a different image feature.

9. The method of claim 1, comprising decompressing the image by using the code to retrieve the template pattern from the dictionary for each sub-region, reconstructing a full image by combining the template patterns for all of the sub-regions, and displaying the reconstructed image.

10. The method of claim 1, wherein each sub-region is further represented by a difference value representing the difference in one or more image features between the image sub-region and the template pattern selected therefor, so as to generate lossless compression data.

11. The method of claim 10, comprising decompressing the image by using the code to retrieve the template pattern from the dictionary for each sub-region and the difference value for one or more image features, reconstructing a lossless replica of the full image by combining the template patterns and the difference values for all of the sub-regions, and displaying the reconstructed image.

12. A compression system for compressing a digital image, the system comprising:
a storage device to store a dictionary having a plurality of predetermined template patterns, wherein said template patterns comprise a plurality of image features, properties or variables such as color, color gradient, gradient direction or reference pixel, and wherein each said template pattern is identified by a code; and
a processor to divide the image into a plurality of sub-regions, to select a template pattern from the dictionary that most closely matches an image feature for each sub-region and to generate a compressed data set for the image in which each sub-region of the image is represented by a code identifying the template pattern selected therefor.

13. The system of claim 12, further comprising a computing device to determine the dictionary before the processor analyzes a first sub-region of the image.

14. The system of claim 12, further comprising a computing device to adjust the dictionary as the processor analyzes one or more sub-regions.

15. The system of claim 12, wherein if the processor determines that none of the plurality of template patterns sufficiently matches an image sub-region, the processor generates a new template pattern and the storage unit adds the new template pattern to the dictionary for compressing the image sub-region.

16. The system of claim 12, wherein the processor divides the image geometrically into a pre-determined number of sub-regions having pre-determined dimensions.

17. The system of claim 12, wherein the processor divides the image based on image content.

18. The system of claim 17, wherein the processor identifies image content boundaries having significant changes in image features and automatically divides the image along the image content boundaries.

19. The system of claim 12, wherein the processor selects a plurality of template patterns for each sub-region so that each pattern most closely matches the sub-region for a different image feature.

20. The system of claim 12, comprising:
a processor to reconstruct the image, wherein the processor uses the code from the compressed data set to retrieve the template pattern from the dictionary for each sub-region and reconstructs a full image by combining the template patterns for all of the sub-regions; and
a display to display the reconstructed image.

21. The system of claim 12, wherein the processor further represents each sub-region by the difference in one or more image features between the sub-region and the template pattern selected therefor so as to generate lossless compression data.

22. The system of claim 21, comprising:
a processor to reconstruct the image, wherein the processor uses the code from the compressed data set to retrieve the template pattern from the dictionary and the difference value for one or more image features for each sub-region, and reconstructs a full lossless image by combining the template patterns and the difference values for all of the sub-regions; and
a display to display the lossless reconstructed image.

* * * * *